United States Patent [19]

Huddleston et al.

[11] Patent Number: 5,134,215

[45] Date of Patent: Jul. 28, 1992

[54] METHOD FOR REDUCING FLUID LOSS FROM OILFIELD CEMENT SLURRIES USING VINYL GRAFTED WATTLE TANNIN

[75] Inventors: David A. Huddleston, Sugar Land; Robert K. Gabel, Houston; Charles D. Williamson, Sugar Land, all of Tex.

[73] Assignee: Nalco Chemical Company, Naperville, Ill.

[21] Appl. No.: 598,059

[22] Filed: Oct. 15, 1990

[51] Int. Cl.$^5$ .............................................. C08H 5/04
[52] U.S. Cl. .................................................... 527/400
[58] Field of Search .......................................... 527/400

[56] References Cited

U.S. PATENT DOCUMENTS

| | | | |
|---|---|---|---|
| 4,277,580 | 7/1981 | Allen et al. | 525/385 |
| 4,515,635 | 5/1985 | Rao et al. | 106/90 |
| 4,579,927 | 4/1986 | Patel et al. | 527/400 |
| 4,671,883 | 6/1987 | Connell et al. | 252/8.515 |
| 4,676,317 | 6/1987 | Fry et al. | 166/293 |
| 4,678,591 | 7/1987 | Giddings et al. | 252/8.514 |
| 4,871,825 | 10/1989 | Lin | 527/400 |
| 4,938,803 | 7/1990 | Huddleston et al. | 106/719 |

FOREIGN PATENT DOCUMENTS 63284289 11/1988 Japan.
2210888 6/1989 United Kingdom.

*Primary Examiner*—Nathan M. Nutter
*Assistant Examiner*—Jeffrey Culpeper Mullis
*Attorney, Agent, or Firm*—Ailes, Ohlandt & Greeley

[57] ABSTRACT

A process for forming an oil well cement composition comprising: mixing cement and a vinyl grafted wattle tannin fluid loss additive, the vinyl grafted wattle tannin comprising a wattle tannin grafted with at least one vinyl monomer selected from the group consisting of: 2-acrylamido-2-methylpropanesulfonic acid and acrylamide, wherein the wattel tannin is present in an amount of between about 2 to about 14 weight percent based on actives, the 2-acrylamido-2-methylpropanesulfonic acid is present in an amount of between about 84 to about 98 percent, and acrylamide is present in an amount of between about 0 to about 4 percent, to form a cement blend; and mixing the cement blend with water.

10 Claims, No Drawings

METHOD FOR REDUCING FLUID LOSS FROM OILFIELD CEMENT SLURRIES USING VINYL GRAFTED WATTLE TANNIN

BACKGROUND OF THE INVENTION

The present invention provides an improved method for reducing fluid loss from oilfield cement slurries using vinyl grafted wattle tannin and tannin derivatives. The vinyl grafted wattle tannin comprises a wattle tannin grafted with at least one vinyl monomer selected from the group consisting of: 2-acrylamido-2-methylpropanesulfonic acid and acrylamide.

Certain polymer compositions have long been recognized by those skilled in the art as additives useful in reducing fluid loss. These compositions are commonly referred to as "fluid loss additives".

Fluid loss additives are typically used in cementing oil wells. For oilfield cementing operations to be successful additives which reduce fluid loss are required to be added to the cement. Such additives will be used in well operations where the bottom hole circulating temperature (BHCT) may range from 80°–400° F., substantial salt concentrations may be present, and cement slurry retardation and viscosity are critical aspects as the same affect pumpability and compressive strength.

Some examples of fluid loss additives are set forth in the following U.S. Pat. Nos.: 4,678,591 (Giddings et al.), issued Jul. 7, 1987, 4,515,635 (Rao et al.), issued May 7, 1985, and 4,676,317 (Fry et al.), issued Jun. 30, 1987.

The Rao patent discloses typical polymers used as fluid loss additives, e.g., copolymers of N,N-dimethylacrylamide and 2-acrylamido-2-methylpropanesulfonic acid having molar ratios of between 1:4 and 4:1, respectively, and an average molecular weight of between about 75,000 and about 300,000. Other fluid loss additives disclosed in the Rao patent are: a copolymer of a sulfonic acid modified acrylamide and a polyvinyl crosslinking agent, and a hydrolyzed copolymer of acrylamide and 2-acrylamido-2-methylpropanesulfonic acid (AMPS).

Giddings et al. disclose a terpolymer composition for aqueous drilling fluids comprising sodium AMPS (72-3.8%), N,N-dimethylacrylamide (13.5-0.7%), and acrylonitrile (9.5-0.5%). This terpolymer composition also contains lignin, modified lignin, brown coal, or modified brown coal in an amount ranging from between 5-95% with the lignin, modified lignin, brown coal, or modified brown coal having been present during the polymerization of the water-soluble polymer. It has a molecular weight in the range of 10,000-500,000. The lignin, modified lignin, brown coal, or modified brown coal is from the group consisting of lignites, sulfonated lignites, lignins, leonardites, lignosulfonates, alkali metal humic acid salts, humic acids, and sulfonated humic acids.

Another fluid loss additive disclosed in Giddings et al. is RESINEX, a sulfonated lignite complexed with sulfonated phenolic resin.

The Fry patent discloses a graft polymer fluid loss additive comprising a backbone of at least one member selected from the group consisting of lignin, lignite, and their salts, and a grafted pendant group of at least one member selected from the group consisting of AMPS, acrylonitrile, N,N-dimethylacrylamide, acrylic acid, N,N-dialkylaminoethyl methacrylate, wherein the alkyl radical comprises at least one member selected from the group consisting of methyl, ethyl and propyl radicals.

The petroleum industry prefers a fluid loss additive that has as little effect on compressive strength, set time, viscosity, and thickening time as possible; a fluid loss additive that is salt tolerant (i.e., does not exhibit substantial loss of effectiveness in the presence of salt); and a fluid loss additive that is chemically stable during cementing operations. Furthermore, fluid loss additives should be compatible with as many other additives and environmental conditions as possible, should be soluble in cement slurries at normal ambient temperatures encountered in oil well cementing operations, and should continue to provide fluid loss characteristics over broad temperature and cement pH ranges.

The present inventors have discovered that fluid loss may be reduced in oilfield cement slurries by using novel vinyl grafted wattle tannin fluid loss additives which encompass much of the aforementioned desired characteristics.

U.S. Pat. No. 4,579,927 (Patel et al.), which issued on Apr. 1, 1986, discloses a water soluble polymer, i.e., a polymer consisting of a minor portion of tannin derived monomers and one or more acrylic monomers, which exhibits thermal stability characteristics when used as an additive in aqueous drilling fluids. These water soluble polymers are purported to control the viscosity, gel strength and fluid loss characteristics of an aqueous drilling fluid when exposed to downhole temperatures in excess of 300° F. The water soluble polymers are typically copolymers of flavanoid tannins and ethylenically unsaturated comonomers. The polymers are formed by free radical initiated polymerization.

Some examples of the water soluble polymer are (1) 20% sulfonated quebracho tannin, 70% AMPS and 10% acrylamide, and (2) 11% sulfonated quebracho tannin, 54% acrylamide, 21% AMPS, and 13% maleic acid. The incorporation of AMPS into the polymer improves the rheology and fluid loss of the drilling fluid. Common sources of flavanoid tannins include extracts of quebracho, wattle, mimosa, mangrove, chestnut, gambier and cutch. In certain applications the flavanoid tannins are sulfonated to enhance solubility characteristics.

All the examples in Patel et al. are directed to sulfonated quebracho tannins. In comparative studies conducted by the present inventors, it was apparent that the novel vinyl grafted wattle tannins of the present invention clearly out performed the quebracho tannins as fluid loss additives in cement slurries. Tannin and acrylamide retard the set time of cement slurries. According to the present invention, the amount of tannin and acrylamide was adjusted to be useful for fluid loss but not overly retard the set time. The data generated by the present inventors demonstrate that the grafted quebracho tannin examples set forth in the Patel et al. patent would not be useful as fluid loss additives for oilfield cementing.

It is noted that the vinyl grafted quebracho tannins of Patel et al. were prepared primarily for use as fluid loss additives in drilling fluids or muds. The application of such fluid loss additives to hydraulic cement, although briefly referred to in Patel et al., was apparently not attempted. Had Patel et al. tried to use the fluid loss additives formed in accordance with the teachings thereof in oilfield cement slurries, it is believed those additives would not have exhibited acceptable fluid loss properties.

The present inventors have discovered through extensive experimentation and comparative analysis that wattle tannin, not quebracho tannin, grafted to selected vinyl monomers performed extremely well as fluid loss additives in cement slurries. Furthermore, when oilfield cement slurries were treated with the vinyl grafted wattle tannins of the present invention they exhibited improved fluid loss control over the corresponding vinyl polymers alone and vinyl monomers grafted with lignite.

The development of a vinyl grafted wattle tannin fluid loss additive that was repeatable and which exhibited satisfactory fluid loss performance characteristics was extremely difficult. Many graft reactions with tannin resins were performed by the inventors. Some resins were made by reacting tannin with formalin under acid and base conditions. Some resins were made with epichlorohydrin and glutaraldehyde under appropriate conditions. Acceptable grafts were only realized when the tannin level was cut back from 20%. The level of initiator required for grafting was proportional to the tannin content. Only when the tannin level was reduced to 14% and below did the grafts become repeatable and the performance improved.

Additional advantages of the present invention shall become apparent as described below.

SUMMARY OF THE INVENTION

A vinyl grafted wattle tannin fluid loss additive comprising a wattle tannin grafted with at least one vinyl monomer selected from the group consisting of: 2-acrylamido-2-methylpropanesulfonic acid and acrylamide. The wattle tannin is preferably present in an amount of between about 2 to about 14 weight percent based on actives. The 2-acrylamido-2-methylpropanesulfonic acid is preferably present in an amount of between about 84 to about 98 percent and the acrylamide is preferably present in an amount of between about 0 to about 4 percent.

Optionally, wattle tannin may be derivatized prior to grafting with the vinyl monomers. The wattle tannin is preferably modified with at least one compound selected from the group consisting of: epichlorohydrin, formaldehyde, and glutaraldehyde.

The vinyl grafted wattle tannin may also include a crosslinking agent to increase branching and molecular weight. The preferred crosslinking agent is methylenebisacrylamide (MBA).

Furthermore, the present invention includes a process for forming an oil well cement composition comprising: mixing cement and a vinyl grafted wattle tannin fluid loss additive to form a cement blend; and mixing the cement blend with water.

The present invention may also include many additional features which shall be further described below.

DESCRIPTION OF THE PREFERRED EMBODIMENTS

The vinyl grafted wattle tannin fluid loss additive according to the present invention comprises a wattle tannin grafted with at least one vinyl monomer selected from the group consisting of: 2-acrylamido-2-methylpropanesulfonic acid (AMPS) and acrylamide (Acam), wherein the wattle tannin is present in an amount of between about 2 to about 14 weight percent based on the resultant polymer, 2-acrylamido-2-methylpropanesulfonic acid is present in an amount of between about 84 to about 98 percent, and acrylamide is present in an amount of between about 0 to about 4 percent.

Tannin is acidic and easily forms relatively stable free radicals. Wattle tannin is condensed by reacting the tannin with epichlorohydrin, formaldehyde, or glutaraldehyde, and also self-condenses under alkaline conditions.

Improvements in the graft were realized when the tannin level was cut back from 20% based on the polymer. When the tannin level was reduced to 14% and below, the grafts became repeatable and the performance improved. The tannin content of the polymer was reduced to 3% tannin. The fluid loss performance was best at that level of tannin.

The molecular weight was modified by holding the temperature constant at 70° C. and varying the initiator concentration, acrylamide concentration and methylenebisacrylamide (MBA) concentration. The acrylamide promoted polymerization, i.e., the rate and final solution viscosity was higher when some acrylamide was added. The acrylamide concentration in the blend of vinyl monomers was varied from 0–4 weight percent with the remainder being AMPS, i.e., 84–98 weight percent. The data in Table 1 below demonstrates the effect of various levels of tannin and acrylamide on thickening time. Table 1 sets forth the thickening time results with Class H cement and 1/2% additive.

TABLE 1

| ADDITIVE | THICKENING TIME (Minutes) |
| --- | --- |
| Blank | 110 |
| A vinyl polymer with 5% Acam | 153 |
| A vinyl grafted tannin with 3% Tannin and 5% Acam | 197 |
| A vinyl grafted tannin with 2% Tannin and 10% Acam | 178 |
| A vinyl grafted tannin with 3% Tannin and 10% Acam | 217 |

The aforementioned data shows that acrylamide and tannin content must be kept relatively low to minimize set time retardation. A crosslinking agent, e.g., MBA, was added to increase branching and molecular weight.

The vinyl grafted wattle tannin has a weight average molecular weight in the range between about 90,000 to about 600,000.

In the process of forming vinyl grafted wattle tannins according to the present invention, a solution of wattle tannin material and either a vinyl monomer or a blend of vinyl monomer(s) are charged into a vessel in the presence of an initiator, such as, ammonium persulfate, and heated. This polymerization process grafts the wattle tannin to the monomer(s).

The process for forming an oil well cement composition comprises: mixing cement and a vinyl grafted wattle tannin fluid loss additive, the vinyl grafted wattle tannin comprising a wattle tannin grafted with at least one vinyl monomer selected from the group consisting of: 2-acrylamido-2-methylpropanesulfonic acid and acrylamide, the wattle tannin is present in an amount of between about 2 to about 14 weight percent 2-acrylamido-2-methylpropanesulfonic acid is present in an amount of between about 84 to about 98 percent, and acrylamide is present in an amount of between about 0 to about 4 percent, to form a cement blend; and mixing the cement blend with water.

The vinyl grafted wattle tannin fluid loss additive is preferably admixed with dry cement in an amount between about 0.2 to about 2 percent by weight of said dry cement. Liquid fluid loss additives are added to mix water and then a cement slurry is formed by adding dry cement to the water/additive mixture under mixing conditions. Dried fluid loss additives are preferably premixed with dry cement and then added to the water.

The water used in forming an oil well cement composition is preferably fresh water, but the water may in some instances contain various salts, such as sodium chloride, potassium chloride, calcium chloride, sea water and the like.

Other types of well known and conventional additives can also be incorporated into the oil well cement composition in order to modify its properties. Such additives may include: additional fluid loss additives or viscosifiers, retarders, accelerators, dispersants, weight-adjusting materials, and fillers. Specific additives are set forth in U.S. Pat. No. 4,676,317 (Fry et al.) which is incorporated herein by reference.

The performance characteristics of the novel vinyl grafted wattle tannin fluid loss additives of the present invention are demonstrated in the table and examples set forth hereafter. Table 2 below contains performance data comparing the vinyl grafted wattle tannins (Samples 1, 2, and 4 to vinyl grafted lignite (Sample 3) and a non-tannin vinyl polymer (Sample 5).

procedure. 600 grams of water, 16.10 grams of wattle tannin, and 1.80 grams of 50% sodium hydroxide solution were added to a two liter resin flask. The flask was equipped with a nitrogen sparge tube, mechanical stirrer, addition funnel, chemical pump feed, condenser, and thermocouple. The pH was 8.5. The solution was purged with nitrogen, stirred, and heated to 70° C. A few drops of an antifoaming agent were added as necessary to control foaming. A solution of 606.3 grams of 58% sodium AMPS, 24.9 grams of 49% acrylamide, 1.50 grams MBA, 170.86 grams of water, and 0.045 grams of ethylenediamine tetracetic acid, sodium salt (EDTA) was pumped steadily into the flask over a two hour period. Approximately 3.12 grams of 27% ammonium persulfate (APS) solution was added every 10 minutes, starting 10 minutes after the monomer solution feed was begun. The APS solution was added over a four hour period. The polymer was reacted 2-3 more hours and 3.00 grams of sodium bisulfite was added. The flask was cooled and the pH was adjusted to about 7. A small amount of a biocide was added to control bacterial growth.

The aforementioned vinyl grafted wattle tannin demonstrated a Brookfield Viscosity (BV) of approximately 1550 cp and a pH of 7.0.

TABLE 2

| SAMPLE NO. | AMPS MOLE % | Acam MOLE % | MBA WT. % | SUBST. WT. % | MW | FWFL (75° C.) | FWFL (180° C.) | FL SALT (75° C.) | FL SALT (180° C.) |
|---|---|---|---|---|---|---|---|---|---|
| 1 | 90 | 10 | 0.4 | 3% Tannin | 564,000 | 36 | 46 | 98 | 38 |
| 2 | 100 | 0 | 0.1 | 7% Tannin | 520,000 | — | 60 | — | — |
| 3 | 90 | 10 | 0 | 20% Lignite | 700,000 | 76 | 118 | 300+ | 253 |
| 4 | 90 | 10 | 0 | 7% Tannin Glutaraldehyde | — | — | 58 | — | — |
| 5 | 90 | 10 | 0.5 | 0 | 1,270,000 | 126 | — | 300+ | — |

The fluid loss performance of the vinyl grafted tannin was significantly better than the vinyl polymer and vinyl grafted lignite of comparable molecular weight without tannin. For example, the vinyl grafted tannin of Sample 1 demonstrated fluid loss in fresh water (FWFL) at 75° C. and 180° C. of 36/46, respectively; whereas the vinyl grafted lignite of Sample 3 demonstrated fluid loss in fresh water at 75° C. and 180° C. of 76/118, respectively. The lower the fluid loss number the better fluid loss performance. Similar fluid loss results were obtained in salt water (FL SALT), i.e., Sample 1 had a fluid loss of 98/38 and Sample 3 was 300+/253.

EXAMPLE 1

A vinyl grafted wattle tannin was prepared from the following components:
  16.10 grams: wattle tannin
  600.00 grams: water
  1.80 grams: 50% caustic
  0.12 grams: an antifoaming agent
  606.30 grams: 58% Na+AMPS
  24.90 grams: 48.6% Acam
  1.50 grams: MBA
  170.86 grams: water
  0.045 grams: ethylenediamine tetracetic acid, sodium salt (EDTA)
  75.00 grams: 27% ammonium persulfate sodium salt (APS)
  3.00 grams: sodium bisulfite (SBS)
  0.38 grams: biocide The aforementioned vinyl grafted wattle tannin was prepared in accordance with the following grafting

EXAMPLE 2

Using the same grafting procedure set forth in Example 1 above, a vinyl grafted wattle tannin was prepared from the following components:
  25.00 grams: wattle tannin
  4.20 grams: 50% caustic
  400.90 grams: 58% Na+AMPS
  0.25 grams: MBA
  511.70 grams: water
  0.03 grams: EDTA
  58.80 grams: 35% ammonium persulfate sodium salt
  16.80 grams: hydrochloric acid solution The aforementioned vinyl grafted wattle tannin demonstrated a Brookfield Viscosity (BV) of approximately 400 cp and a pH of 7.2.

EXAMPLE 3

A tannin resin graft was synthesized from the following components:
  51.50 grams: 27.3% active glutaraldehyde derived tannin resin
  308.90 grams: 58% AMPS
  14.40 grams: 50% Acam
  0.03 grams: EDTA
  2.00 grams: 50% sodium hydroxide
  538.00 grams: water
  84.00 grams: 35% ammonium persulfate sodium salt
  18.00 grams: 50% sodium hydroxide The glutaraldehyde derived tannin resin was prepared by reacting 19.7 grams of wattle tannin, 1.22 grams of glutaraldehyde, and 30.57 grams of water together for five hours at 90° C. and pH 4.3. Water and caustic were added to obtain a pH of 8.5. The monomer solution was fed into the flask for two hours and the initiator was fed into the flask for three hours. This reaction was run at 70° C. After addition of the monomer and initiator the flask was heated for two hours, then cooled and neutralized. Residual AMPS was <0.1.

EXAMPLE 4

A wattle tannin resin graft was synthesized from the following components:
- 249.10 grams: a wattle tannin derivative prepared from 600 grams of wattle tannin reacted with 40 grams of epichlorohydrin
- 333.30 grams: 58% sodium AMPS
- 13.40 grams: 49.9% Acam
- 0.03 grams: EDTA
- 258.40 grams: water
- 100.00 grams: 40% APS
- 12.00 grams: 25% APS
- 12.00 grams: 25% sodium bisulfite The monomer was fed into the flask for 2 hours and 12 shots of 40% APS initiator was fed into the flask every 10 minutes at 70° C. After addition of the monomer and initiator the flask was heated, cooled and neutralized. The Brookfield Viscosity of the vinyl grafted tannin was 1825 cp. The fluid loss was 14 mL at 1 minute, 33 mL at 4 minutes, 45 mL at 6.5 minutes and 220 mL at 30 minutes.

EXAMPLE 5

A wattle tannin resin graft was synthesized from the following components:
- 328.90 grams: a wattle tannin resin
- 333.30 grams: 58% sodium AMPS
- 13.40 grams: 49.9% Acam
- 0.75 grams: MBA
- 0.03 grams: EDTA
- 223.60 grams: water
- 100.00 grams: 24% APS
- 12.00 grams: 25% APS
- 12.00 grams: 25% sodium bisulfite The monomer was fed into the flask for 2 hours and 12 shots of 24% APS initiator was fed into the flask every 10 minutes at 70° C. After addition of the monomer and initiator the flask was heated, cooled and neutralized.

EXAMPLE 6

A quebracho tannin resin graft was synthesized from the following components:
- 249.10 grams: a quebracho tannin derivative prepared from 600 grams of quebracho tannin reacted with 40 grams of epichlorohydrin
- 333.30 grams: 58% sodium AMPS
- 13.40 grams: 49.9% Acam
- 0.75 grams: MBA
- 0.03 grams: EDTA
- 294.80 grams: water
- 100.00 grams: 35% APS
- 12.00 grams: 25% APS
- 12.00 grams: 25% sodium bisulfite The monomer was fed into the flask for two hours and 12 shots of 35% APS initiator was fed into the flask every 10 minutes at 70° C. After addition of the monomer and initiator the flask was heated, cooled and neutralized. The resultant vinyl grafted quebracho tannin exhibited very poor viscosity, i.e., BV was 70 cp, and very poor fluid loss properties, i.e., fluid loss of 22 mL at 1 minute, and 41 mL at 2 minutes and 15 seconds.

Based upon the above examples it is readily apparent that the vinyl grafted quebracho tannins did not perform nearly as well as the vinyl grafted wattle tannins of the present invention.

While we have shown and described several embodiments in accordance with our invention, it is to be clearly understood that the same are susceptible to numerous changes and modifications apparent to one skilled in the art. Therefore, we do not wish to be limited to the details shown and described, but intend to show all changes and modifications which come within the scope of the appended claims.

What is claimed is:

1. A vinyl grafted wattle tannin fluid loss additive for use in oil well cement compositions comprising a wattle tannin grafted with at least one vinyl monomer selected from the group consisting of: 2-acrylamido-2-methylpropanesulfonic acid and acrylamide, wherein said wattle tannin is present in an amount of between 2 to 14 weight percent, said 2-acrylamido-2-methylpropanesulfonic acid is present in an amount of between 84 to 98 percent, and acrylamide is present in an amount of between 0 to 4 percent, wherein said vinyl grafted wattle tannin has a weight average molecular weight in the range between 90,000 to 600,000.

2. The fluid loss additive according to claim 1, where said wattle tannin is a wattle tannin derivative.

3. The fluid loss additive according to claim 2, wherein said wattle tannin is derivatized with at least one compound selected from the group consisting of: epichlorohydrin, formaldehyde, and glutaraldehyde.

4. The fluid loss additive according to claim 1, wherein said vinyl grafted wattle tannin also includes a crosslinking agent.

5. The fluid loss additive according to claim 4, wherein said crosslinking agent is methylenebisacrylamide.

6. An oil well cement composition comprising:
   cement;
   water; and
   a vinyl grafted wattle tannin fluid loss additive comprising a wattle tannin grafted with at least one vinyl monomer selected from the group consisting of: 2-acrylamido-2-methylpropanesulfonic acid and acrylamide, wherein said wattle tannin is present in an amount of between 2 to 14 weight percent, said 2-acrylamido-2-methylpropanesulfonic acid is present in an amount of between 84 to 98 percent, and acrylamide is present in an amount of between 0 to 4 percent, wherein said vinyl grafted wattle tannin has a weight average molecular weight in the range between 90,000 to 600,000.

7. The cement composition according to claim 6, wherein said wattle tannin is a wattle tannin derivative.

8. The cement composition according to claim 7, wherein said wattle tannin is derivatized with at least one compound selected from the group consisting of: epichlorohydrin, formaldehyde, and glutaraldehyde.

9. The cement composition according to claim 6, wherein said vinyl grafted wattle tannin also includes a crosslinking agent.

10. The cement composition according to claim 9, wherein said crosslinking agent is methylene bisacrylamide.

* * * * *